United States Patent
Iijima

(10) Patent No.: US 10,564,658 B2
(45) Date of Patent: Feb. 18, 2020

(54) SERVO CONTROL APPARATUS, SERVO CONTROL METHOD AND COMPUTER-READABLE RECORDING MEDIUM

(71) Applicant: FANUC CORPORATION, Yamanashi (JP)

(72) Inventor: Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 396 days.

(21) Appl. No.: 15/456,959

(22) Filed: Mar. 13, 2017

(65) Prior Publication Data
US 2017/0277206 A1    Sep. 28, 2017

(30) Foreign Application Priority Data

Mar. 24, 2016 (JP) .................... 2016-059938

(51) Int. Cl.
*G05D 17/02* (2006.01)
*G05B 19/416* (2006.01)
*G05B 15/02* (2006.01)

(52) U.S. Cl.
CPC ............ *G05D 17/02* (2013.01); *G05B 15/02* (2013.01); *G05B 19/416* (2013.01); *G05B 2219/41197* (2013.01)

(58) Field of Classification Search
None
See application file for complete search history.

(56) References Cited

U.S. PATENT DOCUMENTS

2010/0148714 A1* 6/2010 Okita ................... G05B 19/404
                                                    318/561
2013/0063064 A1* 3/2013 Fujiwara ................ H02P 29/50
                                                    318/461

FOREIGN PATENT DOCUMENTS

JP         2007-185014 A    7/2007
JP         2008-225632 A    9/2008
                    (Continued)

OTHER PUBLICATIONS

Watanabe et. al., Machine Translation of Japanese publication No. JP2008225632A, Sep. 25, 2008 (Year: 2008).*

(Continued)

*Primary Examiner* — Kenneth M Lo
*Assistant Examiner* — Istiaque Ahmed
(74) *Attorney, Agent, or Firm* — Studebaker & Brackett PC

(57) ABSTRACT

A servo control apparatus includes a velocity command creation unit; a velocity detection unit; a velocity control gain; a torque command creation unit; a filter configured to attenuate a particular frequency band component in a torque command value; a sine-wave sweep input unit configured to perform a sine-wave sweep in a predetermined frequency range; a frequency characteristics calculation unit configured to calculate a frequency characteristic of a sine-wave; and a filter adjustment unit configured to attenuate a particular frequency band component in a torque command value. A signal is input to the velocity control gain. The signal is obtained by adding a sine-wave to a difference between a velocity command value and a velocity detected. The filter adjustment unit measures an influence of the velocity control gain on a resonance frequency and resonance peak amplitude, while changing a value of the velocity control gain, thereby adjusting the filter.

5 Claims, 4 Drawing Sheets

(56) References Cited

FOREIGN PATENT DOCUMENTS

| JP | 2008225632 A | * | 9/2008 |
|---|---|---|---|
| JP | 2013-126266 A | | 6/2013 |
| JP | 2016-034224 A | | 3/2016 |
| WO | 2011/148623 A1 | | 12/2011 |

OTHER PUBLICATIONS

Möhring et al.; Materials in machine tool structures; CIRP Annals—Manufacturing Technology 64; 2015 ; pp. 725-748.

An Office Action issued by the Japanese Patent Office dated Feb. 13, 2018, which corresponds to Japanese Patent Application No. 2016-059938 and is related to U.S. Appl. No. 15/456,959; with English translation.

An Office Action mailed by the Japanese Patent Office dated Aug. 28, 2018, which corresponds to Japanese Patent Application No. 2016-059938 and is related to U.S. Appl. No. 15/456,959.

\* cited by examiner

SERVO CONTROL APPARATUS, SERVO CONTROL METHOD AND COMPUTER-READABLE RECORDING MEDIUM

This application is based on and claims the benefit of priority from Japanese Patent Application No. 2016-059938, filed on 24 Mar. 2016, the content of which is incorporated herein by reference.

BACKGROUND OF THE INVENTION

Field of the Invention

The present invention relates to a servo control apparatus, a servo control method, and a computer-readable recording medium; and in particular, the present invention relates to a servo control apparatus of a servomotor, a servo control method, and a computer-readable information recording medium.

Related Art

A servo control apparatus of a servomotor is disclosed in, for example, Patent Document 1. Patent Document 1 discloses the servo control apparatus, in which a sampling value of a torque command or a current command is converted into servomotor torque strength in frequency; a frequency band in which the servomotor torque strength reaches a peak is determined to be an oscillating band; and a band-stop filter is set up so as to attenuate the servomotor torque strength in the oscillation band, when the velocity control gain is adjusted.

Patent Document 1: Japanese Unexamined Patent Application, Publication No. 2013-126266 (Abstract, paragraph 0008, FIG. 2, etc.)

SUMMARY OF THE INVENTION

However, when a control gain has an influence on not only resonance peak amplitude but also resonance frequencies, Patent Document 1 has not been able to adjust the filter by taking into account the frequency fluctuations thereof.

An object of the present invention is to provide a servo control apparatus, a servo control method, and a computer-readable recording medium, all of which can adjust a filter by taking into account frequency fluctuations, when a control gain has an influence on not only resonance peak amplitude but also resonance frequencies.

(1) A servo control apparatus (e.g., servo control apparatus 10 to be described later) according to the first aspect of the present invention includes: a velocity command creation unit (e.g., velocity command creation unit 100 to be described later) configured to create a velocity command value of a servomotor (e.g., servomotor 20 to be described later); a velocity detection unit (e.g., velocity detection unit 107 to be described later) configured to detect a velocity of the servomotor; a velocity control gain (e.g., velocity control gain 101 to be described later) that is a control gain of a velocity control loop; a torque command creation unit (e.g., torque command creation unit 102 to be described later) configured to create a torque command value for the servomotor; at least one filter (e.g., filter 103 to be described later) configured to attenuate a particular frequency band component included in the torque command value; a sine-wave sweep input unit (e.g., sine-wave sweep input unit 104 to be described later) configured to perform a sine-wave sweep in a predetermined frequency range; a frequency characteristics calculation unit (e.g., frequency characteristics calculation unit 105 to be described later) configured to calculate frequency characteristics of a sine-wave that is swept; and a filter adjustment unit (e.g., filter adjustment unit 106 to be described later) configured to adjust the filter so as to attenuate a particular frequency band component included in the torque command value; in which the velocity control gain, the torque command creation unit, the filter, and the velocity detection unit configure the velocity control loop; a signal, which is obtained by adding a sine-wave being output from the sine-wave sweep input unit to a difference between the velocity command value and the velocity detected, is input to the velocity control gain; and the filter adjustment unit is configured to detect a resonance frequency included in the frequency characteristics that is calculated by way of the frequency characteristics calculation unit, while changing a value of the velocity control gain, and configured to adjust the filter by measuring an influence of the velocity control gain on a resonance frequency and resonance peak amplitude.

(2) In the servo control apparatus according to the first aspect of the present invention, the filter adjustment unit may determine evaluation of a resonance characteristic and applicability of the filter, based on a quantitative relationship between a value of the velocity control gain and resonance peak amplitude in the frequency characteristics obtained from the frequency characteristics calculation unit.

(3) In the servo control apparatus according to the first or second aspect of the present invention, the filter adjustment unit may determine evaluation of a resonance characteristic and applicability of the filter, based on a quantitative relationship between a value of the velocity control gain and a resonance frequency in frequency characteristics obtained from the frequency characteristics calculation unit.

(4) A servo control method according to a fourth aspect of the present invention is a servo control method for a servo control apparatus, in which the method includes: creating a velocity command value of a servomotor; detecting a velocity of the servomotor; inputting a signal, which is obtained by adding a sine-wave being swept in a predetermined frequency range to a difference between the velocity command value and the velocity detected, to a velocity control gain; creating a torque command value for the servomotor, based on an output from the velocity control gain; attenuating a particular frequency band component included in the torque command value by way of at least one filter; and driving the servomotor, based on the torque command value with the particular frequency band component attenuated; in which the servo control method for the servo control apparatus calculates frequency characteristics of the sine-wave that is swept in the predetermined frequency range; detects a resonance frequency included in the frequency characteristics calculated, while changing a value of the velocity control gain; and adjusts the filter so as to attenuate a particular frequency band component included in the torque command value, by measuring an influence of the velocity control gain on a resonance frequency and resonance peak amplitude.

(5) A servo control program according to the fifth aspect of the present invention is a servo control program that causes a computer as a servo control apparatus of a servomotor to execute the processing of: creating a velocity command value of the servomotor; detecting a velocity of the servomotor; inputting a signal, which is obtained by adding a sine-wave being swept in a predetermined frequency range to a difference between the velocity command value and the velocity detected, to a velocity control gain; creating a torque command value for the servomotor, based on an output from the velocity control gain; attenuating a particular frequency band component included in the torque command value by way of at least one filter; and driving the servomotor, based on the torque command value with the particular frequency band component attenuated; in which the program further causes the computer to: calculate frequency characteristics of the sine-wave that is swept in the predetermined frequency range; detect a resonance frequency included in the frequency characteristics calculated, while changing a value of the velocity control gain; and adjust the filter so as to attenuate a particular frequency band component included in the torque command value, by measuring an influence of value of the velocity control gain on a resonance frequency and resonance peak amplitude.

According to the present invention, when a control gain has an influence on not only resonance peak amplitude but also resonance frequencies, it is possible to adjust a filter by taking into account the frequency fluctuations thereof as well.

DETAILED DESCRIPTION OF THE INVENTION

An embodiment of the present invention is hereinafter described with reference to the drawings.

Figure 1:
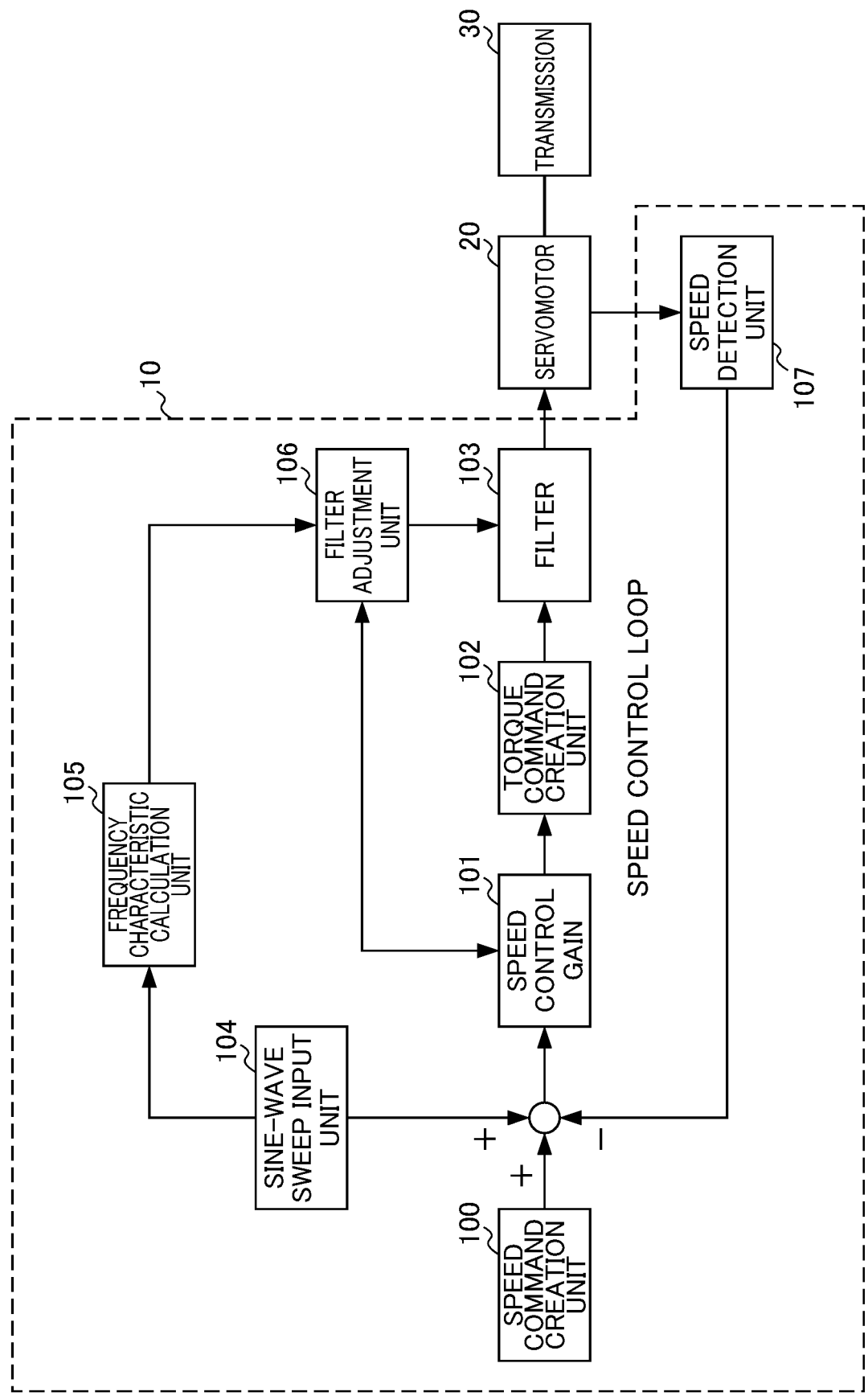
FIG. 1 is a block diagram illustrating a system including a servo control apparatus, a servomotor, and a transmission of one embodiment according to the present invention.

FIG. 1 is a block diagram illustrating a system including a servo control apparatus, a servomotor, and a transmission of one embodiment according to the present invention.

As illustrated in FIG. 1, the servo control apparatus 10 includes: a velocity command creation unit 100 that creates a velocity command value of the servomotor 20; a velocity control gain 101 that is a control gain of a velocity control loop; a torque command creation unit 102 that creates a torque command value of the servomotor 20; and a filter 103 that attenuates a particular frequency band component included in the torque command value.

Further, the servo control apparatus 10 includes: a velocity detection unit 107 that detects a velocity of the servomotor 20; a sine-wave sweep input unit (also referred to as a sine-wave disturbance input unit) 104 that performs a sine-wave sweep to the velocity control loop in a predetermined frequency range; a frequency characteristics calculation unit 105 that calculates frequency characteristics of a sine-wave that is swept by way of the sine-wave sweep input unit 104; and a filter adjustment unit 106 that adjusts the filter 103 so as to attenuate a particular frequency band component included in the torque command value.

The velocity control gain 101, the torque command creation unit 102, the filter 103, and the velocity detection unit 107 configure the velocity control loop that controls a rotation velocity of the servomotor 20. Although one filter 103 is illustrated in FIG. 1, a plurality of filters 103 may be provided.

The transmission 30 is a feed axis of a machine tool, a reducer that decelerates the rotational speed of the servomotor 20, a conversion mechanism that converts a rotational motion of the servomotor 20 into a linear motion, and the like.

Figure 2:
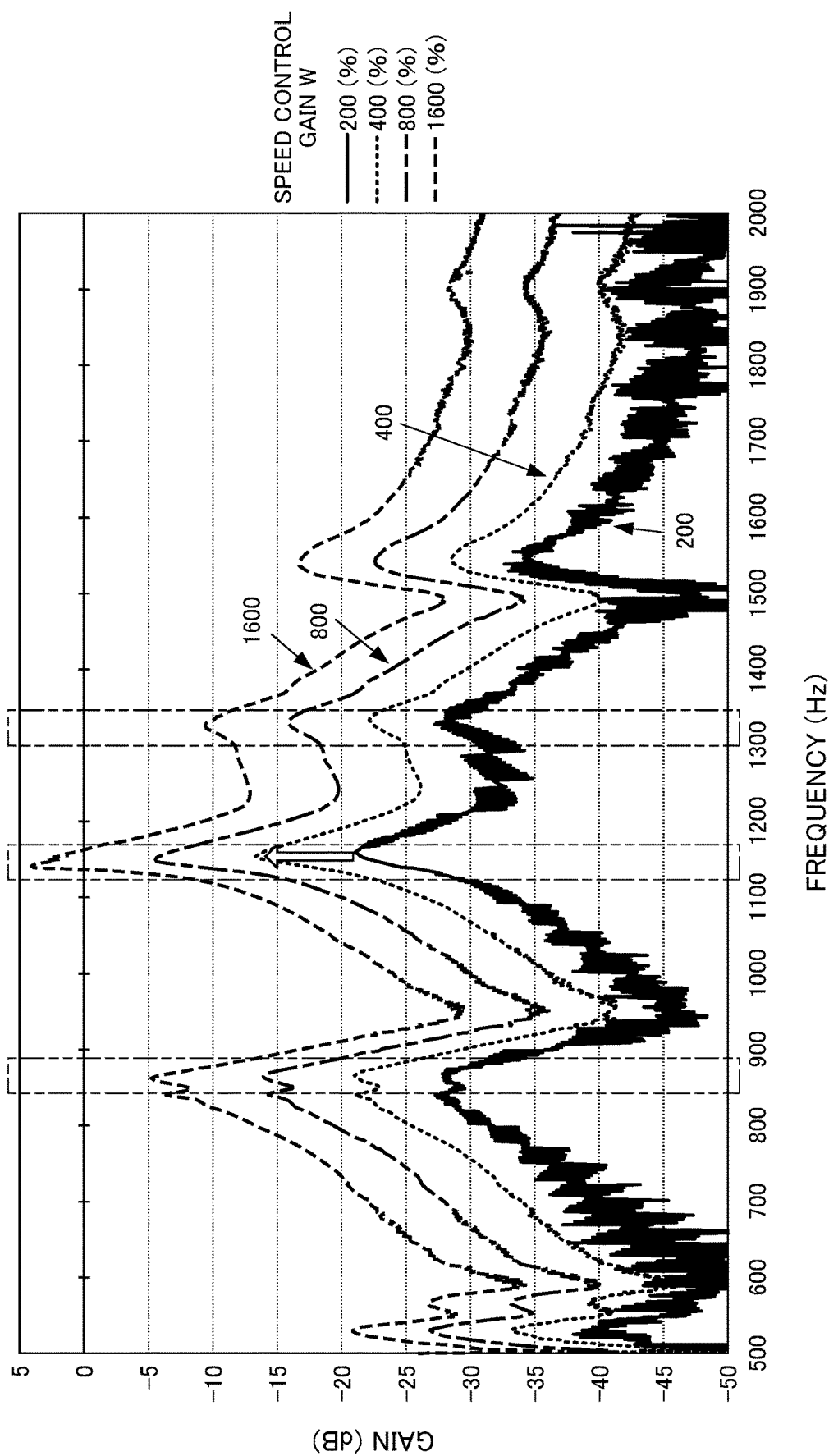
FIG. 2 is a characteristics graph illustrating a relationship between frequencies and gains (amplitude) in a case where a velocity control gain fluctuates, in the servo control apparatus of one embodiment according to the present invention.

The filter adjustment unit 106 refers to an output value of the velocity control gain 101, while changing the value of the velocity control gain 101, and detects resonance frequencies included in the frequency characteristics calculated by way of the frequency characteristics calculation unit 105. In addition, the filter adjustment unit 106 measures the influence of the velocity control gain 101 on its resonance frequency and resonance peak amplitude, thereby adjusting the frequency band to be attenuated in relation to the filter 103. For example, as illustrated in FIG. 2, while the filter adjustment unit 106 changes a value ω of the velocity control gain of the velocity control gain 101 to 200, 400, 800, and 1600(%), the filter adjustment unit 106 refers to the output value of the velocity control gain 101, and detects resonance frequencies included in the frequency characteristics calculated by way of the frequency characteristics calculation unit 105. In addition, the filter adjustment unit 106 measures the influence of the velocity control gain 101 on its resonance frequency and resonance peak amplitude, thereby adjusting the filter 103 so as to attenuate a particular frequency band component included in the torque command.

As described above, FIG. 2 is a characteristics graph illustrating a relationship between frequencies and resonance peak gains (resonance peak amplitude) in a case where the velocity control gain fluctuates. As illustrated in FIG. 2, it is found that when the filter adjustment unit 106 changes the value ω of the velocity control gain to 200, 400, 800, and 1600(%), the resonance peak increases correspondingly to the increase in the velocity control gain. Further, it is found that when the filter adjustment unit 106 changes the value ω of the velocity control gain to 200, 400, 800, and 1600(%), the magnitude relationship between the values of two resonance peak gains will change in the frequency domain in the neighborhood of 860 Hz, correspondingly to the increase in the velocity control gain (namely, the resonance frequency, in which a maximum resonance peak gain can be obtained, will shift to the high frequency side), and the resonance frequency, in which a resonance peak gain can be obtained, will shift to the low frequency side in the frequency domains in the neighborhood of 1,150 Hz and in the neighborhood of 1,310 Hz.

Note that a resonance frequency drift occurs due to other factors as well; for example, Non-patent Document 1 (H.-C. Möhring (2) et al. CIRP Annals-Manufacturing Technology 64 (2015) 725-748) provides a report on resonance of a mechanical structure, and describes that a bending vibration has a relatively larger resonance frequency drift than a torsional vibration, and that the resonance frequency is likely to change in a resonance mode due to bending. In the present embodiment, attention is focused on such characteristics, and when the influence of the velocity control gain 101 on resonance frequencies is significant, the filter adjustment unit 106 adjusts the filter 103 so as to attenuate a particular frequency band component included in the torque command, by taking into account the frequency fluctuations thereof as well.

Figure 3:
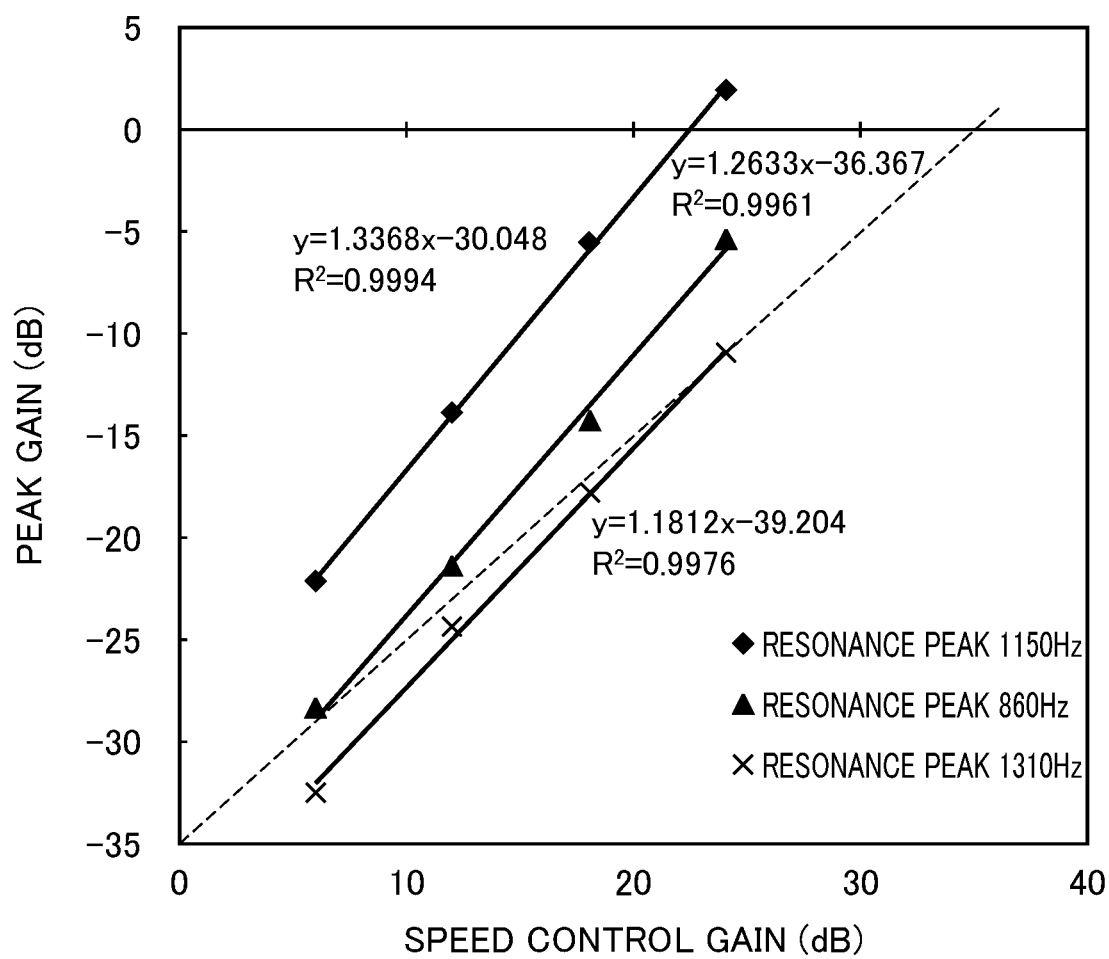
FIG. 3 is a characteristics graph, in which a horizontal axis (x-axis) represents velocity control gains in decibels, and a vertical axis (y-axis) represents resonance peak gains (resonance peak amplitude) in decibels, in the servo control apparatus of one embodiment according to the present invention.

The filter adjustment unit 106 can describe a quantitative relationship, in a numerical formula, between the value of the velocity control gain 101 and the resonance peak amplitude of the frequency characteristics obtained from the frequency characteristics calculation unit 105, and determine evaluation of the resonance characteristics and applicability of the filter. FIG. 3 is a characteristics graph, in which the horizontal axis (x-axis) represents the velocity control gains in decibels, and the vertical axis (y-axis) represents the resonance peak gains (resonance peak amplitude) in decibels. FIG. 3 illustrates resonance peak gains in a frequency range in the neighborhood of 860 Hz, resonance peak gains in a frequency range in the neighborhood of 1,150 Hz, and resonance peak gains in a frequency range in the neighborhood of 1,310 Hz. These frequency ranges are each illustrated with the dotted lines in FIG. 2.

The quantitative relationship between the velocity control gains and the resonance peak gains should be represented with the straight lines illustrated in FIG. 3, as expressed in the following three numerical formulas (Formulas 1 to 3), in the cases where the value $\omega$ of the velocity control gain is 200, 400, 800, or 1600, respectively. In FIG. 3, y represents a resonance peak gain, and x represents a velocity control gain. In FIG. 3, $R^2$ represents a coefficient of determination, and serves as a rough standard for indicating how the straight lines expressed in Formulas 1 to 3 are applicable.

$y=1.2633x-36.367$(FREQUENCY RANGE IN NEIGHBORHOOD OF 860 Hz)  [Formula 1]

$y=1.3368x-30.048$(FREQUENCY RANGE IN NEIGHBORHOOD OF 1,150 Hz)  [Formula 2]

$y=1.1812x-39.204$(FREQUENCY RANGE IN NEIGHBORHOOD OF 1,310 Hz)  [Formula 3]

Here, in terms of the quantitative relationship between the velocity control gains and the resonance peak gains, the slope of the straight line should be 1 (one) in a linear system (spring-mass-damper system). However, as expressed in Formulas 1 to 3, the slope of the straight line is greater than 1 (one). The increase in the slope greater than 1 (one) represents increase in "speed" of non-linear resonance growth. If the filter adjustment unit 106 determines priority in filter application in order of this "speed", a filter with faster non-linear resonance growth can be preferentially adjusted. As is apparent from Formulas 1 to 3, since the slopes are 1.3368>1.2633>1.1812, the order of priority descends from the frequency range in the neighborhood of 1,150 Hz, the frequency range in the neighborhood of 860 Hz, to the frequency range in the neighborhood of 1,310 Hz. Therefore, the filter adjustment unit 106 can inspect how each gain peak (resonance mode) grows in relation to the velocity control gains, and definitely determine the priority, based on parameter values quantified therefrom. As a result, it is possible to realize quantitative evaluation of a resonance mode by way of multiple frequency response measurements under different control gains, and filter intensity adjustment as well as priority determination based thereon.

Further, the filter adjustment unit 106 can determine evaluation of the resonance characteristics and applicability of the filter, based on the quantitative relationship between the value of the velocity control gain 101 and the resonance frequencies of the frequency characteristics obtained from the frequency characteristics calculation unit 105. As described above, it is found from FIG. 2 that when the value $\omega$ of the velocity control gain is changed to 200, 400, 800, and 1600(%), the resonance frequency during the resonance peak amplitude will shift to the high frequency side or the low frequency side. Therefore, the filter adjustment unit 106 can determine in which frequency a resonance peak occurs, and determine to which frequency band the filter should be applied, correspondingly to the value of the velocity control gain.

Next, an operation of the servo control apparatus is described with reference to the flowchart of FIG. 4.

Firstly, the velocity command creation unit 100 outputs a velocity command value (a target value of the velocity); and the sine-wave sweep input unit 104 outputs a sine-wave (sine-wave disturbance) in a predetermined frequency range (Step S201). For example, the sine-wave sweep input unit 104 performs a sine-wave sweep in a frequency range from, for example, 500 Hz to 2,000 Hz. The velocity detection unit 107 detects an actual velocity value of the servomotor 20 (Step S202), and outputs a velocity detection value.

Next, an adder adds a sine-wave ($\alpha$) to a velocity error (Vsub) between the velocity command value and the actual velocity detection value, and inputs the additional value thereof to the velocity control gain 101. The filter adjustment unit 106 sets up a value $\omega$ of the velocity control gain of the velocity control gain 101. The torque command creation unit 102 generates a torque command value, based on an output value ($\omega \cdot$(Vsub+$\alpha$)) of the velocity control gain 101 (Step S203), and outputs the torque command value to the filter 103. The frequency characteristics calculation unit 105 calculates frequency characteristics of the sine-wave swept by way of the sine-wave sweep input unit 104 (Step S204).

The filter adjustment unit 106 detects resonance frequencies and resonance peak amplitude included in the frequency characteristics calculated by way of the frequency characteristics calculation unit 105, based on the output value ($\omega \cdot$(Vsub+$\alpha$)) of the velocity control gain 101 and the frequency characteristics calculated by way of the frequency characteristics calculation unit 105 (Step S205).

Next, the filter adjustment unit 106 determines whether the velocity control gain should be changed to calculate frequency characteristics again (S206). In the case in which the velocity control gain should be changed to calculate frequency characteristics again (YES in S206), the filter adjustment unit 106 adjusts the velocity control gain (Step S207), and the processing returns to Step S201.

On the other hand, in the case in which the velocity control gain is not changed (NO in S206), the filter adjustment unit 106 performs the fitting of the quantitative relationship between the velocity control gain and each resonance peak amplitude and resonance frequency (Step S208), determines resonance to which the filter should be applied (Step S209), and designates filter characteristics for resonance to be filtered, for the filter 103 (S210).

All or part of the servo control apparatus of the embodiment described above can be implemented by hardware, software or a combination thereof. Herein, the implementation by software means implementation by a computer that reads and executes a program. When configured with hardware, part or all of the servo control apparatus illustrated in FIG. 1 can be configured with, for example, an integrated circuit (IC) such as LSI (Large Scale Integrated Circuit), ASIC (Application Specific Integrated Circuit), gate array, and FPGA (Field Programmable Gate Array).

Figure 4:
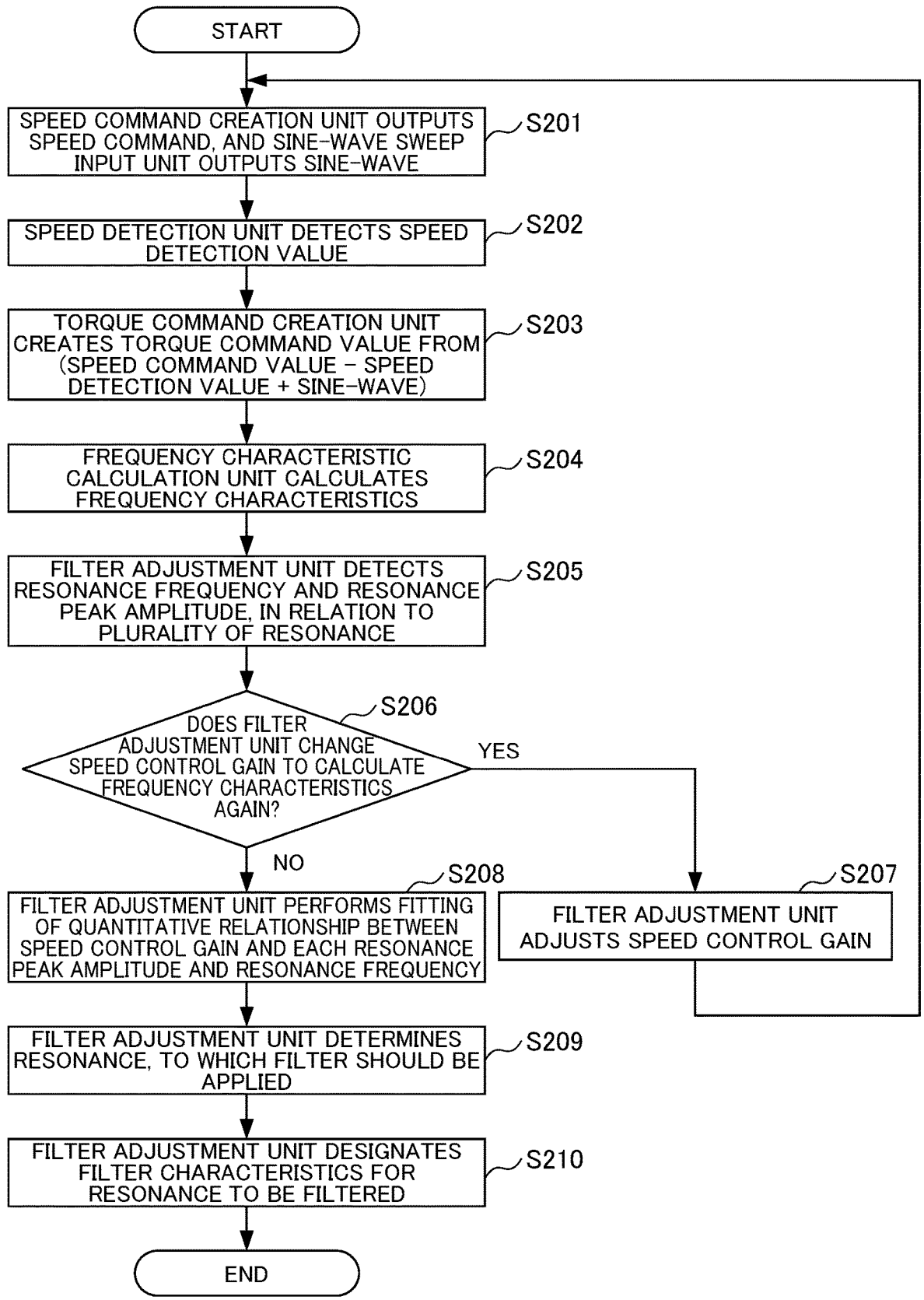
FIG. 4 is a flowchart illustrating an operation of the servo control apparatus of one embodiment of the present invention.

In the case in which all or part of the servo control apparatus is configured with software, a computer is configured with: a storage unit such as a hard disk and ROM which store a program describing all or part of the operations of the servo control apparatus illustrated in the flowchart of FIG. 4; DRAM which store data necessary for computation; CPU; and a bus which connects each unit; in which information necessary for computation is stored in the DRAM, and the program is operated in the CPU, whereby all or part of the functions can be realized.

A program is stored by using various types of computer-readable media, and can be supplied to a computer. The computer-readable media include a non-transitory computer-readable medium. Further, the computer-readable media include various types of tangible storage media. Examples of the non-transitory computer-readable media include: a magnetic recording medium (e.g. flexible disk, magnetic tape, hard disk drive), a magneto-optical recording medium (e.g. magneto-optical disk), CD-ROM (Read Only Memory), CD-R, CD-R/W, semiconductor memory (e.g. Mask ROM, PROM (Programmable ROM), EPROM (Erasable PROM), flash ROM, and RAM (random access memory)).

According to the servo control apparatus and the servo control method of the present embodiment described above, resonance characteristics are analyzed after understanding the behavior integrating the gain and the filter, thereby allowing for automatic adjustment without following the hunches, and making maximum use of a finite number of filters.

Moreover, according to the servo control apparatus and the servo control method of the present embodiment, quantification including a non-linear behavior of a resonance mode allows for improving the accuracy of adjustment, and easily realizing a further robust control system.

EXPLANATION OF REFERENCE NUMERALS

10: servo control apparatus
20: servomotor
30: transmission
100: velocity command creation unit
101: velocity control gain
102: torque command creation unit
103: filter
104: sine-wave sweep input unit
105: frequency characteristics calculation unit
106: filter adjustment unit
107: velocity detection unit

What is claimed is:
1. A servo control apparatus, comprising:
a velocity command creation circuit configured to create a velocity command value of a servomotor;
a velocity detection circuit configured to detect a velocity of the servomotor;
a velocity control gain that is a control gain of a velocity control loop;
a torque command creation circuit configured to create a torque command value for the servomotor;
at least one filter circuit configured to attenuate a particular frequency band component included in the torque command value;
a sine-wave sweep input circuit configured to perform a sine-wave sweep in a predetermined frequency range;
a frequency characteristics calculation circuit configured to calculate frequency characteristics of a sine-wave that is swept; and
a filter adjustment circuit configured to adjust the filter circuit so as to attenuate a particular frequency band component included in the torque command value; wherein
the velocity control gain, the torque command creation circuit, the filter circuit, and the velocity detection circuit configure the velocity control loop;
a signal is input to the velocity control gain, the signal being obtained by adding a sine-wave being output from the sine-wave sweep input circuit to a difference between the velocity command value and the velocity detected;
the filter adjustment circuit is configured to detect a plurality of resonance frequency bands included in frequency characteristics that are calculated by way of the frequency characteristics calculation circuit, while changing a value of the velocity control gain, and configured to adjust the filter circuit by measuring an influence of the velocity control gain on a resonance frequency and resonance peak amplitude; and
the filter adjustment circuit is further configured to evaluate a rate of increase of the resonance peak amplitude with respect to changes in the velocity control gain in multiple frequency bands based on a quantitative relationship between a value of the velocity control gain and resonance peak amplitude of frequency characteristics obtained from the frequency characteristics calculation circuit, and adjust the filter while giving higher priority to the frequency band having a higher rate of increase.

2. The servo control apparatus according to claim 1, wherein the filter adjustment circuit determines evaluation of a resonance characteristic and applicability of the filter circuit, based on a quantitative relationship between a value of the velocity control gain and a resonance frequency of frequency characteristics obtained from the frequency characteristics calculation circuit.

3. A servo control method for a servo control apparatus, the method comprising:
creating a velocity command value of a servomotor;
detecting a velocity of the servomotor;
inputting a signal to a velocity control gain, the signal being obtained by adding a sine-wave being swept in a predetermined frequency range to a difference between the velocity command value and the velocity detected;
creating a torque command value for the servomotor, based on an output from the velocity control gain;
attenuating a particular frequency band component included in the torque command value by way of at least one filter; and
driving the servomotor, based on the torque command value with the particular frequency band component attenuated,
wherein the servo control method for the servo control apparatus further comprises:
calculating frequency characteristics of the sine-wave that is swept in the predetermined frequency range;
detecting a resonance frequency included in the frequency characteristics calculated, while changing a value of the velocity control gain;
adjusting the filter so as to attenuate a particular frequency band component included in the torque command value, by measuring an influence of value of the velocity control gain on a resonance frequency and resonance peak amplitude;
evaluating a rate of increase of the resonance peak amplitude with respect to changes in the velocity control gain in multiple frequency bands based on a quantitative relationship between a value of the velocity control gain and resonance peak amplitude of frequency characteristics obtained from the calculation of frequency characteristics; and
adjusting the filter while giving higher priority to the frequency band having a higher rate of increase.

4. A non-transitory computer-readable medium storing a servo control program causing a computer as a servo control apparatus of a servomotor to execute the processing of:
creating a velocity command value of the servomotor;
detecting a velocity of the servomotor;
inputting a signal to a velocity control gain, the signal being obtained by adding a sinewave being swept in a predetermined frequency range to a difference between the velocity command value and the velocity detected;
creating a torque command value for the servomotor, based on an output from the velocity control gain;
attenuating a particular frequency band component included in the torque command value by way of at least one filter; and
driving the servomotor, based on the torque command value with the particular frequency band component attenuated,
wherein the program further causes the computer to:
calculate frequency characteristics of the sine-wave that is swept in the predetermined frequency range;
detect a resonance frequency included in the frequency characteristics calculated, while changing a value of the velocity control gain;
adjust the filter so as to attenuate a particular frequency band component included in the torque command value, by measuring an influence of value of the velocity control gain on a resonance frequency and resonance peak amplitude;
evaluate a rate of increase of the resonance peak amplitude with respect to changes in the velocity control gain in multiple frequency bands based on a quantitative relationship between a value of the velocity control gain and resonance peak amplitude of frequency characteristics obtained from the calculation of frequency characteristics; and
adjust the filter while giving higher priority to the frequency band having a higher rate of increase.

5. A servo control apparatus, comprising:
a processor;
the processor configured to create a velocity command value of a servomotor;
the processor configured to detect a velocity of the servomotor;
a velocity control gain that is a control gain of a velocity control loop;
the processor configured to create a torque command value for the servomotor;
the processor including at least one filter configured to attenuate a particular frequency band component included in the torque command value;
the processor configured to perform a sine-wave sweep in a predetermined frequency range;
the processor configured to calculate frequency characteristics of a sine-wave that is swept; and
the processor configured to adjust the filter so as to attenuate a particular frequency band component included in the torque command value; wherein
the velocity control gain and the processor configure the velocity control loop;
a signal is input to the velocity control gain, the signal being obtained by adding a sinewave being output from the processor to a difference between the velocity command value and the velocity detected;
the processor is configured to detect a resonance frequency included in frequency characteristics that is calculated by way of the processor, while changing a value of the velocity control gain, and configured to adjust the filter by measuring an influence of the velocity control gain on a resonance frequency and resonance peak amplitude; and
the processor is further configured to evaluate a rate of increase of the resonance peak amplitude with respect to changes in the velocity control gain in multiple frequency bands based on a quantitative relationship between a value of the velocity control gain and resonance peak amplitude of frequency characteristics obtained from the processor, and adjust the filter while giving higher priority to the frequency band having a higher rate of increase.

* * * * *